INVENTOR
LAWRENCE A. TATE

BY Seyfarth, Rothwell, Mion and Zinn

ATTORNEYS

STORED ADDRESS MEMORY
Original Filed June 4, 1959 8 Sheets-Sheet 2
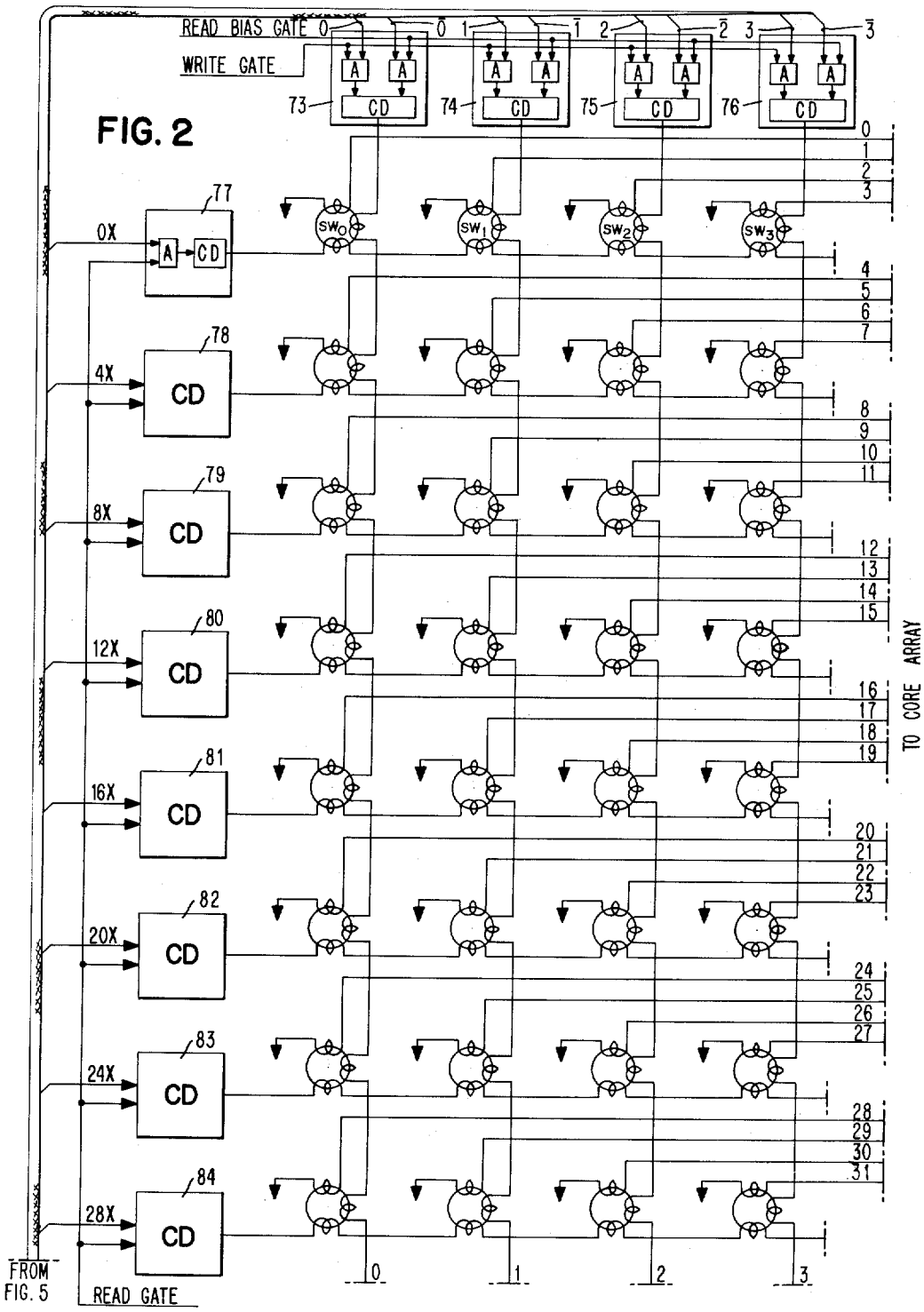

STORED ADDRESS MEMORY

Original Filed June 4, 1959 8 Sheets-Sheet 6

United States Patent Office

Re. 25,599
Reissued June 16, 1964

25,599
STORED ADDRESS MEMORY

Lawrence A. Tate, Poughkeepsie, N.Y., assignor to International Business Machines Corporation, New York, N.Y., a corporation of New York Original No. 2,981,931, dated Apr. 25, 1961, Ser. No. 818,113, June 4, 1959. Application for reissue Dec. 17, 1962, Ser. No. 245,641
13 Claims. (Cl. 340—172.5)

Matter enclosed in heavy brackets [ ] appears in the original patent but forms no part of this reissue specification; matter printed in italics indicates the additions made by reissue.

This invention relates to a system for sequentially addressing memory locations in accordance with a program and more particularly to a system for reading and writing in a core memory according to a stored program.

The core memory of this invention may be a conventional core matrix comprised of a plurality of two-state cores. These cores store 1's in the set condition and 0's in the reset condition. Readout is obtained by addressing a core with a one-half select reset current simultaneously on X and Y coordinate windings associated therewith to reset the core and provide a readout on its sense winding only if said core had been originally in the set (1) condition. Regeneration of readout data or introduction of new data to memory may be provided.

The core memory may be multiplanar, that is, three dimensional. In one specific case the memory includes seven planes to accommodate a 7-bit code (CAB 8–4–2–1) and each plane is comprised by a 32 by 32 core array to provide up to 1,024 data storage locations. The addressing signal channels for the core memory may be identified by X and Y. The channels address a bit in each bit plane and consequently for simplicity sake only one plane (two-dimensional matrix) will be considered. The X channel is typical and will be discused for illustration purposes. This channel includes an X address ring which contains the X address of the first selected core in memory to be addressed. The ring transfers its address to *channel addressing and driving means which address the selected core in the memory. The channel addressing and driving means may include any conventional circuitry, for example* a trigger register and [the trigger register in turn transfers the address to] a switch core matrix [while itself retaining said address]. Transfer to the *channel addressing and driving means* [switch core matrix] provides addressing of the selected core in memory. The *channel addressing and driving means are coupled to the X address ring so that in response to the addressing of a selected core* [switch core matrix, still controlled by the register, is cleared of the address and in so doing] the next address in sequence is stored in the address ring so that the X address of the next selected core in memory is set up.

The above is the basic system involved as far as components are concerned but the flexibility of this system is vastly increased by the addition in series of a plurality of addressing rings in either the X or Y or both channels. Each of the address rings may have a different program or routine and these programs or routines may be combined by appropriate address ring selection means so as to provide a large number of possible programming sequences for addressing the core memory.

It is accordingly one object of this invention to provide a novel system for addressing a core memory from a stored address.

It is another object of this invention to provide a flexible system for addressing core memory in which a plurality of stored programs or routines are incorporated in the system and means are provided to select ones of said plurality.

It is a further object of the invention to provide a system for the addressing of memory which is largely free running. Said object is achieved by a closed-loop system in which the addressing of memory from an address store to read and write therein functions to store the next address of memory in said address store.

These and other objects will become apparent upon a detailed description of the accompanying drawings.

In the drawings:

FIGURE 2 is a schematic representation of a switch core matrix and driving circuits therefor as one example of a system constructed in accordance with the teachings of this invention;

Figure 3A:
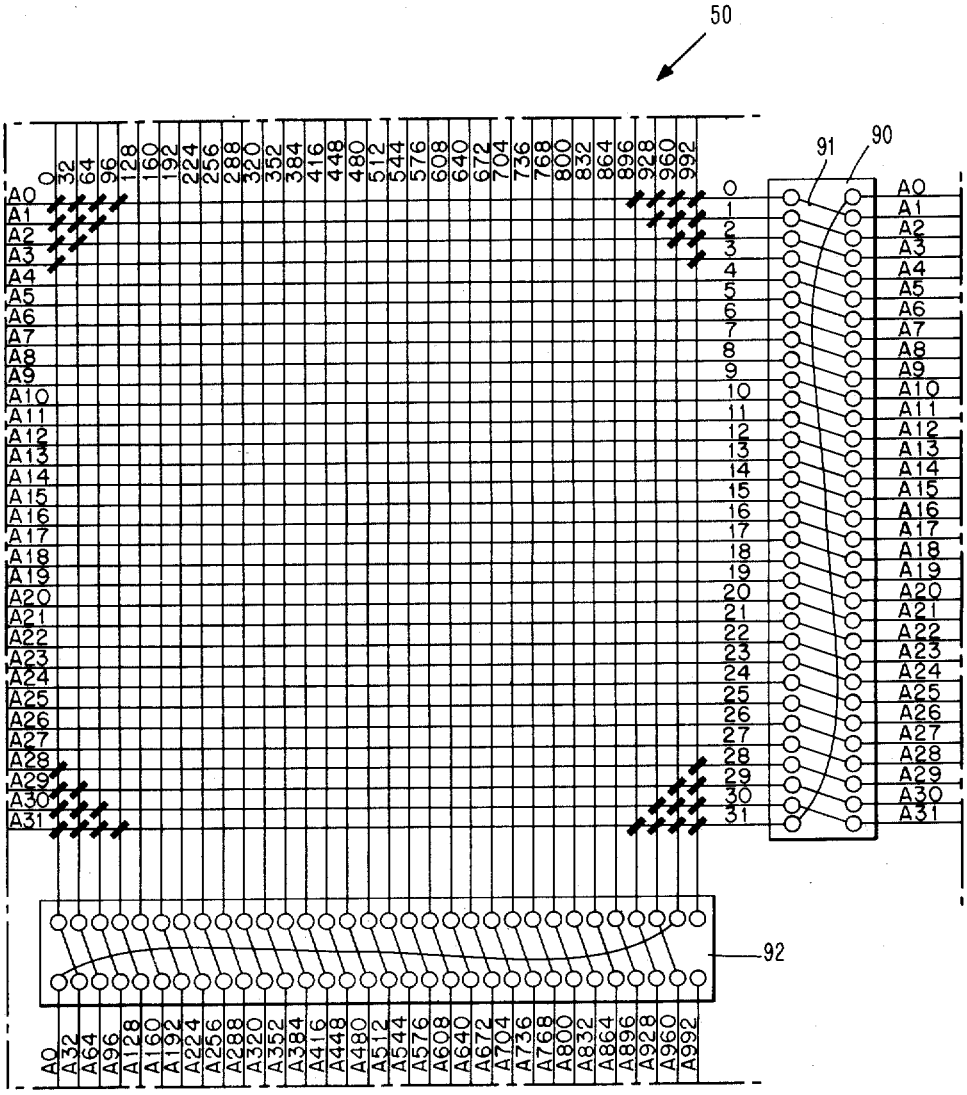
Figure 4:
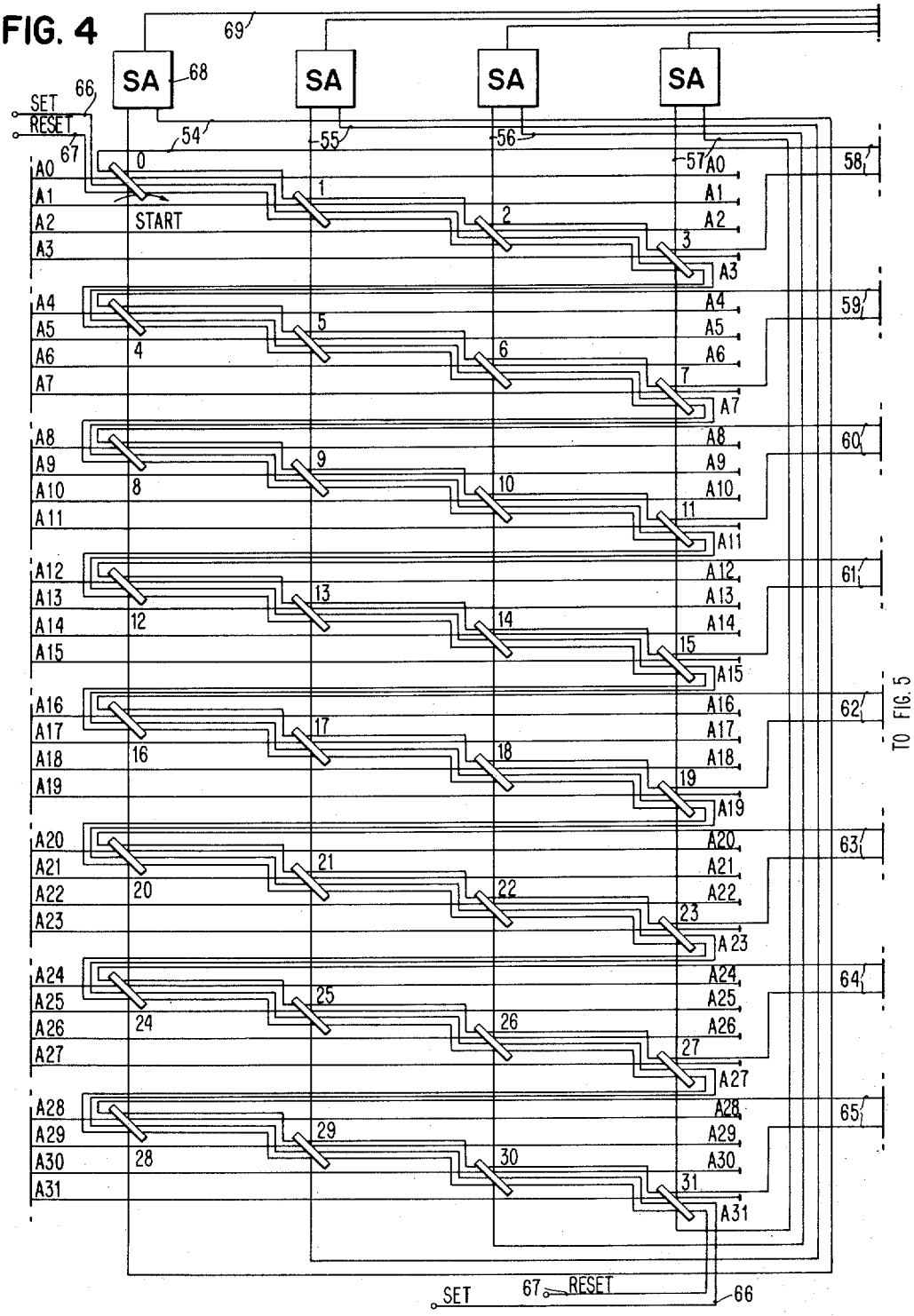
Figures 5, 6:
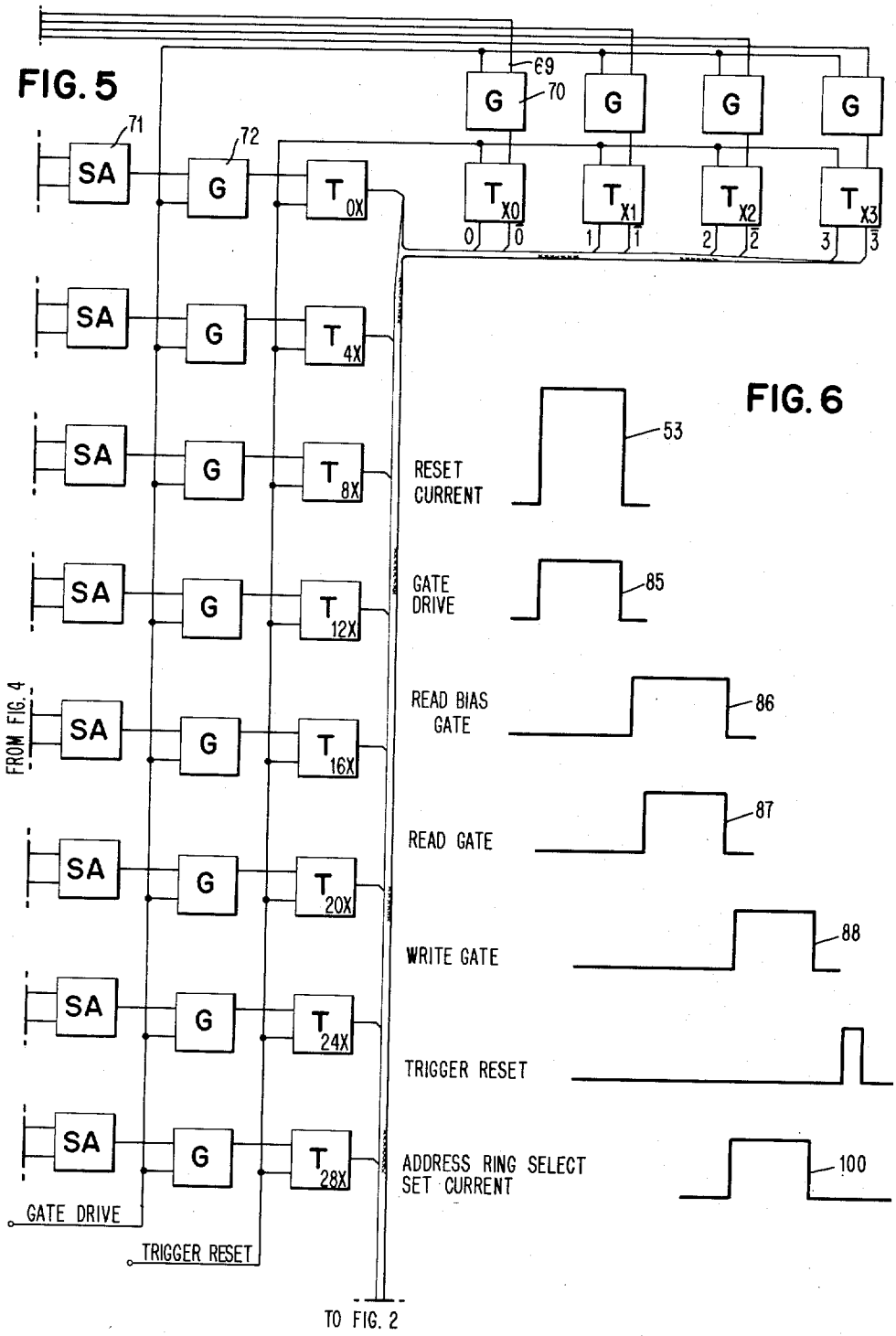
Figure 7:
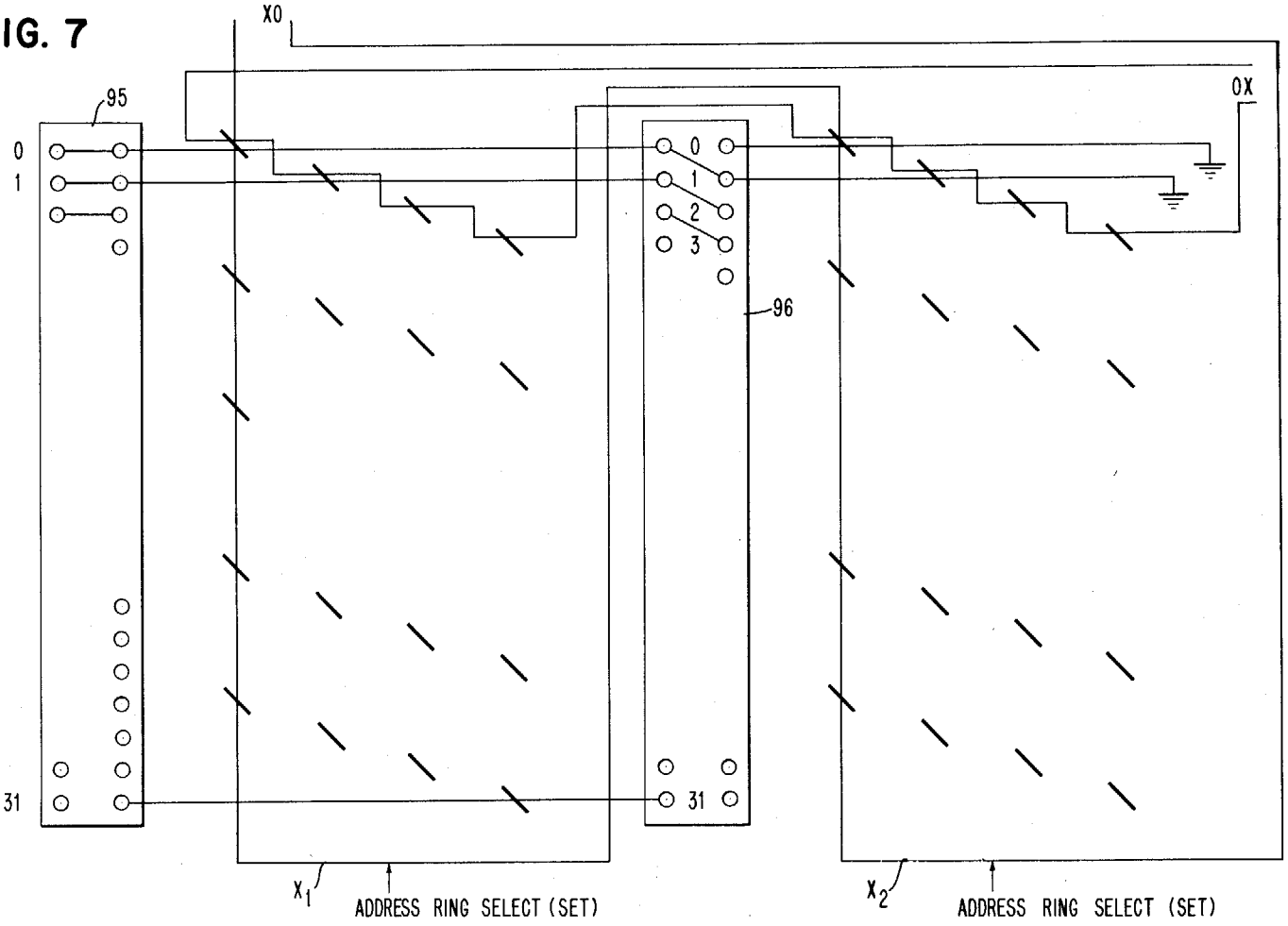

FIGURES 3a, b and c are schematics showing the core memory in combination with X and Y channel program strips which are associated with corresponding X and Y address rings constructed in accordance with this invention;

FIGURE 4 is a schematic of an address ring constructed in accordance with this invention;

FIGURE 5 is a schematic of a trigger register and register driving circuits associated therewith constructed in accordance with the teachings of this invention;

FIGURE 6 is a timing chart;

FIGURE 7 is a schematic showing the serial connection of two address rings constructed in accordance with this invention.

Figure 1:
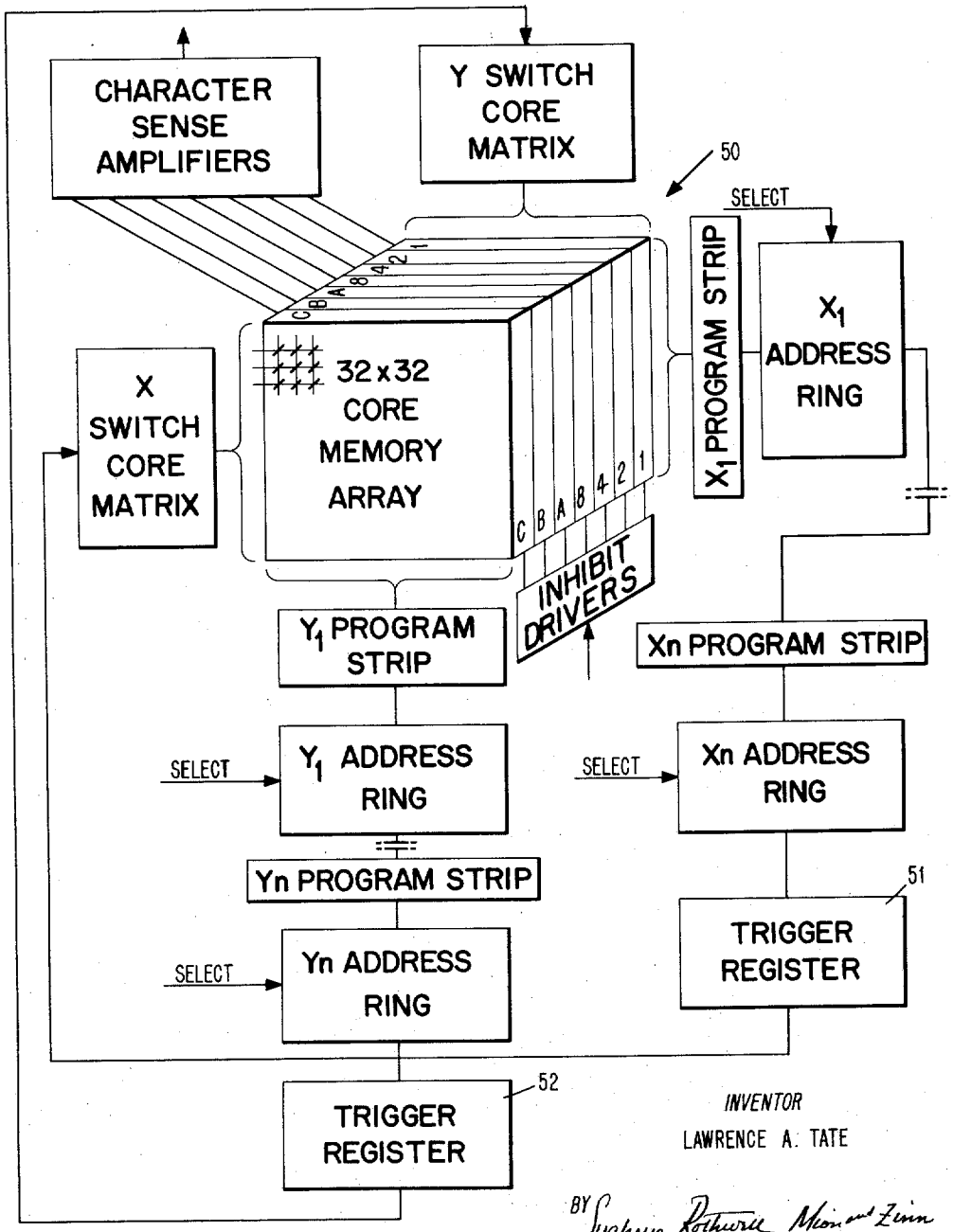
FIGURE 1 is a diagrammatic representation of the system constructed in accordance with this invention, part of the system being shown in perspective.

Turning first to FIGURE 1, the core memory indicated generally by the numeral 50 is specifically illustrated as a three-dimensional memory composed of seven bit planes identified in accordance with the 7-bit code employed. Each plane is composed of a 32 by 32 core matrix. The X and Y switch core matrices drive each one of the planes in parallel and consequently for simplicity purposes let us consider the addressing of one of the bit planes. Let it be assumed that the X and Y address of the selected core is contained in the $X_1$ and $Y_1$ address ring. These addresses are transferred to the trigger registers [11]*51* and [12]*52* and said registers control the addressing of memory from the X switch core matrix and Y switch core matrix. Upon the addressing of the selected core in core memory by the switch core matrices, the address of the next selected core in memory to be addressed in accordance with the stored program is stored via the $X_1$ program strip and $Y_1$ program strip in the associated address rings. The addressing of the selected core in memory resets said core and the sense winding associated therewith provides a signal to an associated sense amplifier if the selected core had originally stored a 1. No sense output is provided if the selected core originally stored a 0.

As will be explained subsequently, a plurality of address rings in the X and Y channels may be employed and the selection of these rings provides an extremely flexible addressing arrangement that may be employed in accordance with this invention. Each of the address rings has its associated program strip. These strips are only examples of a means that may be used.

Turning next to FIGURE 4, there is shown a typical address ring which for illustration purposes we shall identify as the $X_1$ address ring, said ring being for present purposes the only address ring in the X channel. The address ring is comprised of a plurality of two-state cores which, as can be seen here, are identified as cores 0 through 31, inclusive. The cores are arranged in [and] *an* 8 by 4 array. There are a total number of cores equal to the number of rows of cores in memory. Each core has a vertical sense winding 54, 55, 56 or 57 and a horizontal sense winding 58 through 65, inclusive. A set winding 66 and a reset winding 67 are common to all cores in the ring. To the reset winding is applied, by a source not shown, full reset current. To the set winding is applied, by a source not shown, one-half set current. The other one-half set current necesary to set a core is supplied on *start* lines identified as $A_0$ through $A_{31}$, inclusive, each being identified and associated with a particular core 0 through 31, inclusive and driven by the switch core matrix.

As an example of one means to initiate the addressing cycle, a start pulse is applied to core 0 on the start winding $A_0$ identified therewith. This sets core 0. As can be seen in FIGURE 6, a reset pulse 53 is then applied on winding 67 to all the cores in the ring. This will of course result in an output on the two sense windings *54, 58* of core 0 only since all of the other cores were initially reset. The output on sense winding 54 is fed to sense amplifier 68 which provides an output on line 69 to AND gate 70 as shown in FIGURE 5. The horizontal sense line 58 which is energized by the reset pulse to the ring provides an output to sense amplifier 71 in FIGURE 5 which provides an output therefrom which is fed to one input of AND gate 72. As can be seen by FIGURE 6, coincident with this reset current pulse is a gate drive pulse 85 which is applied to the gate drive line shown in FIGURE 5 to all of the gates including gates 70 and 72. Consequently, these two gates, namely 70 and 72, will set their associated triggers identified as 0X associated with gate 72 and X0 associated with gate 70. Now the X address of the first core in memory to be addressed has been transferred from the ring through the associated sensing amplifiers and gates to the trigger register of FIGURE 5.

The trigger register is composed of four horizontal triggers identified as X0, X1, X2 and X3 and eight vertical triggers identified as 0X, 4X, 8X, 12X, 16X, 20X, 24X, and 28X. These four horizontal triggers have true and complement outputs. The eight vertical triggers have a single output, each of which is up or down depending on whether the trigger is on or off. These trigger outputs are fed to the core drivers shown in FIGURE 2. The four horizontal triggers connect their outputs to the core drivers identified in FIGURE 2 as 73, 74, 75 and 76. The eight vertical triggers are respectively associated with core drivers 77 through 84, inclusive. Consequently, at this stage of the address cycle the true input to core driver 73 is up and the 0X input to driver 77 is up.

As can be seen in FIGURE 6, shortly after the application of the gate drive pulse 85 to the gate drive terminal resulting in the transfer of the address from the ring to the trigger register, there occurs pulse 86 which is identified as the read bias gate. This is applied to the core drivers 73 through 76, inclusive (*FIG. 2*). As can be seen, each of these core drivers is identical and includes two AND gates, a left-hand AND gate and a right-hand AND gate, the outputs of both of which feed a conventional OR gate with or without amplification to provide an output to a vertical winding associated with the cores in the switch core matrix of FIGURE 2. In the particular case under consideration then, the application of the read bias gate to gates 73, 74, 75, and 76 results in an output from core drivers 74, 75, and 76 but not from 73. This is because both the left-hand and right-hand AND gates associated with core drivers 73 are blocked but the right-hand AND gate associated with core drivers 74, 75, and 76 are unblocked since the complement lines thereof are up and the read bias gate is applied to each of the right-hand AND gates.

Shortly after the initiation of the read bias gate, pulse 87 identified as the read gate is applied to the vertical core drivers 77 through 84, inclusive. Each one of these core drivers is identical and includes an AND gate and possibly an amplifier for amplifying the output of the AND gate. In the particular case under consideration, then, only the AND gate associated with core driver 77 will provide an output. Consequently, the output from the core driver 77, full set current, is applied to the set windings of the *cores* [core] $SW_0$ through $SW_3$ in the top horizontal row of the switch core matrix. The output from the core drivers 74, 75, and 76 are full reset currents applied to the reset windings associated with in this particular case cores $SW_1$, $SW_2$, and $SW_3$. These three cores are then inhibited and are not set by the output of core driver 77. Only core $SW_0$ is set thereby. The setting of $SW_0$ provides a one-half reset select pulse on its output winding which connects to row 0 cores in memory 50. This row is addressed by the matrix of FIGURE 2 under control of the trigger register to provide the X coordinate address. Together with the Y coordinate address characters such as 1's are readout from the seven addressed cores (in a 7-plane memory). These characters are sensed by the sense amplifiers of FIGURE 1.

Referring again to FIGURE 6, the write gate pulse 88 is now applied to the left-hand gates of the core drivers 73 through 76, inclusive (*FIG. 2*). Only the left-hand AND gate associated with core driver 73 provides an output which is a full reset current pulse and accordingly resets core $SW_0$. The output winding of $SW_0$ now provides a one-half set pulse to row 0 cores of memory. This together with the Y coordinates address and inhibit driver, either stores *the* same information or new information in the addressed cores.

*Refer now to FIGURES 3a, b, c which show three examples of the core memory matrix 50 of FIGURE 1 together with X and Y program strips.* The matrix of FIGURE 3 is a 32 by 32 matrix and for convenience sake the cores are numbered in the first column 0 to 31 and in the next column 32 to 63, and in the third column 64 to 95, etc. By row 0 is meant the row in which the first core therein is the number 0 core. We are of course here talking only about the X channel and ignoring for the moment the address from the Y channel. Now at the same time that the row 0 of this matrix of this core memory is addressed during the write gate, the output signal from the switch core matrix is also applied to the $X_1$ program strip 90. In accordance with the connections made between the input and output contacts, the strip 90 as can [been] *be* seen here provides an advance of 1 row for each address cycle. Consequently, the one-half set pulse supplied at write time of the address cycle passes through the row 0 cores to the terminal strip 90 and then by connection 91 to winding $A_1$ of the address ring in FIGURE 4. At the same time as can be seen by FIGURE 6, an address ring select pulse 100 (a one-half set pulse) is applied to the set winding 66 of the address ring of FIGURE 4. These two pulses combine in the address ring to set core 1.

After the trigger reset pulse, as shown in FIGURE 6, has been applied to all of the triggers in the trigger register to empty the register of the previous address, the address cycle may again be repeated. Now the address of the selected core in memory which is to be addressed is stored in core 1 of the ring and will in the same manner as has previously been described be transferred from the ring to the register and then under control of the register the switch core matrix will address the said selected core in memory.

Turning for a moment to FIGURE 3a, the terminal strip 90 as can be seen is so constructed and arranged that on successive address cycles, rows 0 to 31 in memory are addressed. After addressing row 31 as can be seen row 0 is next addressed. Turning to the $Y_1$ program terminal strip 92, it can be seen that following the addressing of column 960 the addressing is shifted to column 0. Consequently, the entire 1,024 storage positions are not employed. In an arrangement such as shown here all of the cores up to core 992 can be addressed. If we attempted to use all of the storage locations with an arrangement such as this, of course, additional means would have to be provided to prevent the repetitious reading of the same cores.

Figure 3B:
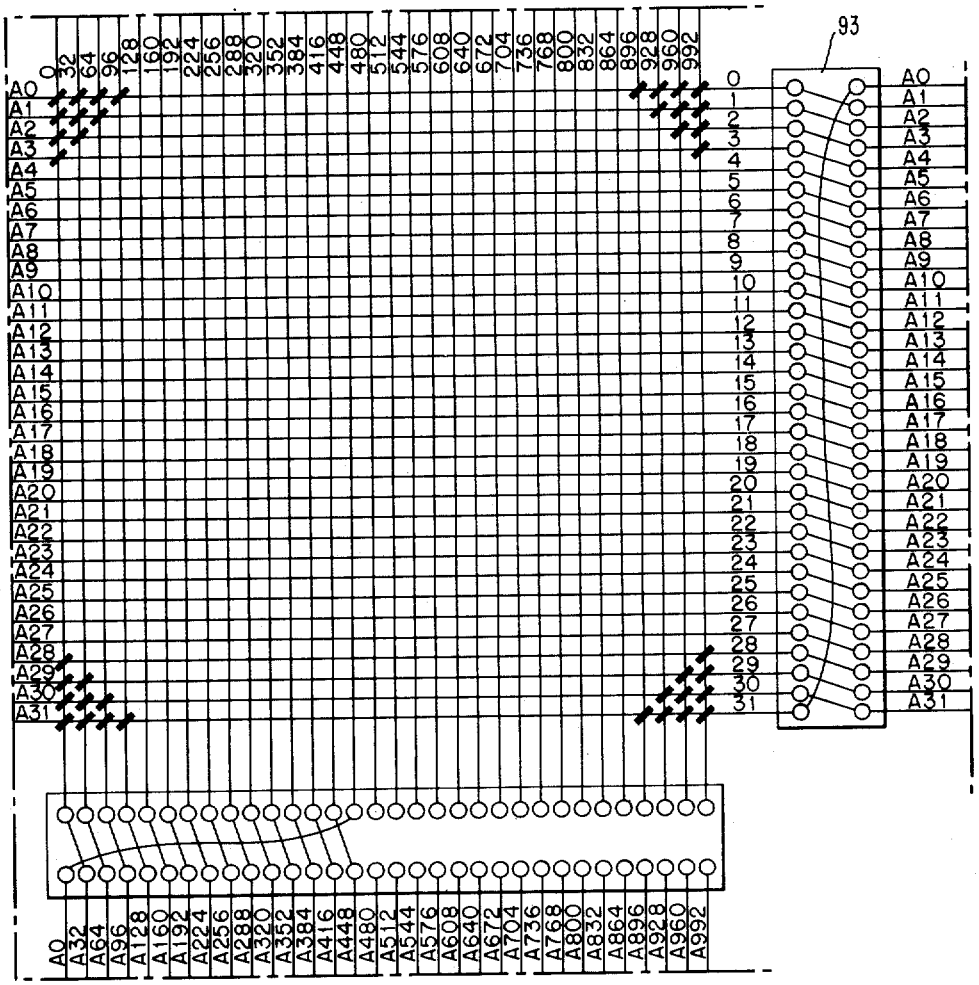
Figure 3C:
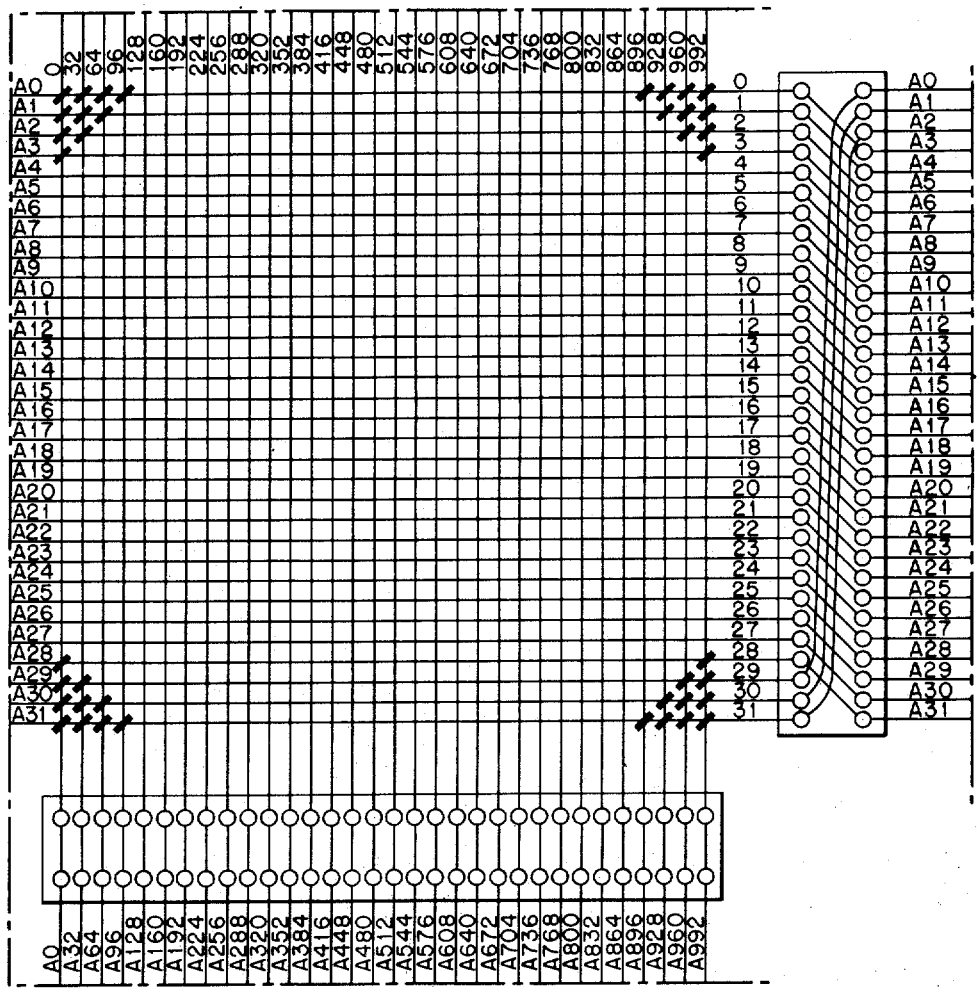

While FIGURE 3a shows a core memory in which the X and Y addresses skip 1 each time, that is, advance from either one row to the next or one column to the next as the case may be, the other memories shown in FIGURES 3b and 3c are somewhat different. For instance, in FIGURE 3b while the $X_1$ program strip 93 is similar to that of 90, the $Y_1$ program strip covers columns 0 through 448 only before recycling back to column 0. This means that cores 0 to 479 only will be addressed. By using several such partial address rings, a memory may be divided into several smaller, independently addressed sections.

The matrix memory shown in FIGURE 3c provides an $X_1$ program strip of the so-called skip-by-three type, that is, the addressing commences with row 0 and then skips down to row 3 and from row 3 to row 6, etc. The $Y_1$ program strip is a stationary ring. Consequently, if we assume that the Y address commences with column 0 we would readout first core 0 followed by core 3, core 6, core 9, etc., until all of the cores in the 0 column had been addressed. Then additional means not shown would have to be provided to shift the stationary ring to column 32 and the addressing of that column would commence in a similar fashion. This provision of an additional means emphasizes the potential of the system to accommodate more than one X or Y address ring in the X or Y channel. FIGURE 7 shows how two address rings can be connected. Each has its own associated program strip. For illustration purposes, let us assume that these two address rings are identified as $X_1$ and $X_2$. Let us further assume that the $X_1$ program strip 95 is a stationary ring such as shown in conjunction with FIGURE 3c. Let us assume that the $X_2$ program strip 96 is an advance 1 type of strip such as shown in connection with FIGURES 3a or 3b. Let us further asume that the Y channel is addressed in accordance with the terminal strip 92 shown in FIGURE 3a, that is, the column is advanced 1 each address cycle. If address ring $X_1$ is selected by the proper application of a select pulse to the set winding such as 66 in FIGURE 4, then it is possible to readout cores 0, 32, 64, . . . 960 without employing the $X_2$ address ring. However, to shift down to the next row, namely row 1, immediately after the readout of core 960 the address ring select pulse is applied to the $X_2$ address ring. This addresses core No. 1 in the next address cycle. Then for the next address cycle, $X_1$ address ring is again selected and continued until the addressing of core 961. So it can be seen that by the proper selection of *the* address rings many different types of addressing of memory can be obtained. Of course, we have shown here only two addres rings of two particular types connected together and have illustrated a number of others in connection with FIGURES 3a, [and] 3b, and 3c but it should be recalled that these variations can be achieved in the X and Y channels and that up to hundreds of these rings may be connected together.

What has been shown and described are various embodiments of the present invention. Other embodiments obvious from the teachings herein to those skilled in the art are believed to be within the spirit and scope of the following claims.

What is claimed is:

1. A system for sequentially addressing cores in a core memory in accordance with a program, said memory comprising an X by Y array of cores, that comprises [and] *an* X coordinate addressing channel and a Y coordinate addressing channel, each channel including at least one ring having a number of stages equal to the number of cores defining said channel coordinate, each stage [including a core] *being associated with a predetermined coordinate address according to a program routine and operable when activated to store said predetermined address,* means *to activate a predetermined stage* to store the first coordinate address of said program in said ring, a register, means to transfer said coordinate address to said register, [a switch core matrix for addressing said memory,] means to address said memory [from said matrix] under the control of said register to readout addressed memory information and to read-in [address] *addressed* memory information, [a program terminal strip associated with each of said rings, said strip having input terminals and an equal number of output terminals in number equal to the number of cores defining said channel coordinate, means to connect said input and output terminals in accordance with a routine of said program,] means operatively connecting said [matrix, said strip] *means to address said memory* and said ring whereby addressing of said memory by said [matrix] *addressing means activates a stage and* stores in said ring the next sequential address of said program, and means to empty said register.

2. A system according to claim 1 wherein one channel includes a plurality of rings, each [having an] associated [terminal strip means to connect the input and output terminals of each strip in the channel] with a different routine of said program, means connecting said [matrix] *means to address said memory* with each [of] said [strips and its associated] ring, and selective means for allowing only one of said rings to be operated by said [matrix] *means to address said memory* in accordance with [the program set in] its associated [strip] *program routine.*

3. A system according to claim 1 in which both of said channels include a plurality of rings, each ring [in each channel having an associated terminal strip, means to connect the input and output terminals of each strip] in a channel *being associated* with a different routine of said program, means connecting said [matrix] *means to address said memory* in each channel with each of said [strips] *rings* in the channel [and its associated ring,] and selective means for each channel for allowing only one of said rings to be operated in a channel by the said [matrix] *addressing means* in accordance with [the program set in] its associated [strip] *program routine.*

4. A system for sequentially addressing locations in an X by Y random access memory having an X coordinate addressing channel and a Y coordinate addressing channel, comprising: a first address storage [matrix] *means* having a maximum of X binary storage elements, a second address storage [matrix] *means* having a maximum of Y binary storage elements, [a first program strip having a set of input and output terminals equal in number to X, a second program strip having a set of input and output terminals equal in number to Y, means connecting each output terminal on said first program strip with corresponding binary elements in said first matrix, means connecting each output terminal on said second program strip with corresponding binary elements in said second matrix, means to selectively interconnect the input and output terminals of said first program strip, means to selectively interconnect the input and output terminals of said second program strip,] means to set one binary storage element in each of said first and second [matrices] *address storage means* to a first state, means associated with each *binary element of* said first [matrix] *address storage means* and responsive to [a] *said* binary element in its first state to generate a corresponding memory X coordinate address signal, means associated with *each binary element of* said second [matrix] *address storage means* and responsive to [a] *said* binary element in its first state to generate a corresponding memory Y coordinate address signal, means directing each X coordinate address signal to [an associated X input terminal on said first program strip] *a predetermined binary element of said first address storage means,* means directing each Y coordinate address signal to [an associated Y input terminal on said second program strip,] *a predetermined binary element of said second address storage means,* means for conditioning a binary element in said first [matrix] *address storage means* to be switched to its first state in response to said X coordinate address signal [appearing on an output terminal of said first program strip] *directed thereto,* and means for conditioning a binary element in said second [matrix] *address storage means* to be switched to its first state in response to said Y coordinate address signal [appearing on an output terminal on said second program strip] *directed thereto.*

5. A system according to claim 4 in which said X and Y coordinate address signals are used to address a location in said memory.

6. A system according to claim 4 in which both the random access memory and *the binary elements of* said first and second [matrix] *address storage means* are comprised of magnetic cores.

7. A system for sequentially addressing locations in an X by Y random access memory having an X coordinate addressing channel and a Y coordinate addressing channel, comprising, a first plurality of address storage matrices each having a maximum of X binary storage elements, a second plurality of address storage matrices each having a maximum of Y binary storage elements, a first plurality of program strips each having a set of input and output terminals equal in number to X, a second plurality of program strips each having a set of input and output terminals equal in number to Y, means connecting the output terminals on each of the first plurality *of* program strips with corresponding binary elements in associated ones of said first plurality *of* matrices, means connecting the output terminals on said second plurality *of* program strips with corresponding binary elements in associated ones of said second plurality *of* matrices, means to selectively interconnect the input and output terminals of each of said first plurality *of* program strips, means to selectively interconnect the input and output terminals of each of said second plurality *of* program strips, means to set one binary storage element in one of said first plurality *of* and second plurality matrices to first state, means associated with said first plurality *of* matrices and responsive to a binary element in its first state to generate a corresponding memory X coordinate address signal, means associated with said second *of* plurality matrices and responsive to a binary element in its first state to generate a corresponding memory Y coordinate address signal, means directing each X coordinate address signal to an associated X input terminal on each of said first plurality *of* program strips, means directing each Y coordinate address signal to an associated Y input terminal on said second plurality *of* program strips, means for conditioning a binary element in one of said first plurality *of* matrices to be switched to its first state in response to said X coordinate address signal appearing on an output terminal of its associated program strip, and means conditioning a binary element in one of said second plurality *of* matrices to be switched to its first state in response to said Y coordinate address signal appearing on an output terminal of its associated program strip.

8. A system according to claim 7 in which both the random access memory and all of said address storage matrices are comprised of magnetic cores.

9. A system according to claim 7 in which said X and Y coordinate address signals are used to address a location in said memory.

*10. In a matrix memory which has at least one coordinate addressing channel including a plurality of drive line means, each associated with a different channel address, which are operated to address storage locations in said memory; and which has addressing means responsive to a channel address for selecting and operating the associated drive line means to read out and read in information;*

*the improvement in means for sequentially operating the drive line means in said addressing channel in accordance with different program routines comprising:*

*(a) at least two address storage means each comprising a plurality of bistable devices, each bistable device of each address storage means being operatively connected to one of the drive line means but no two bistable devices of the same address storage means being connected to the same drive line means,*

*(b) selectively operable enabling means for each address storage means for enabling the bistable devices thereof to be switched to a set state in response to operation of the drive line means coupled thereto,*

*(c) selectively operable reset means for each address storage means for resetting the bistable devices thereof,*

*(d) output means coupled to each bistable device for generating a predetermined channel address in response to a change of the associated bistable device from the set state to the reset state; and*

*(e) means for transmitting said channel address to the addressing means.*

*11. The invention defined in claim 10 wherein the output means of at least some of the bistable devices which are coupled to the same drive line means generate different channel addresses.*

*12. In a magnetic core matrix memory system which includes X and Y coordinate addressing channels each including a plurality of drive lines associated with different channel addresses, said drive lines being energized in predetermined combinations to address storage locations in said memory, each consisting of one drive line from the X channel and one drive line from the Y channel, and which system has addressing means for each channel responsive to a channel address for selecting and energizing the associated drive lines to read out and read in information;*

*the improvement in means for sequentially energizing the drive lines in each said addressing channel in accordance with a program routine comprising for each addressing channel:*

*(a) at least one address storage means comprising a plurality of bistable magnetic cores, each bistable core being inductively coupled to one drive line of the corresponding addressing channel, but no two bistable cores of the same address storage means being coupled to the same drive line,*

*(b) selectively operable enabling means for each address storage means for enabling the bistable cores thereof to be switched to a set state in response to energization of the drive lines coupled thereto,*

*(c) selectively operable reset means for each address storage means for resetting the bistable cores thereof,*

*(d) output winding means coupled to each bistable core for generating a predetermined channel address in response to a change of the associated bistable core from the set state to the reset state; and*

*(e) means for transmitting said channel address to the addressing means to cause the drive line associated with that channel address to be energized to read-out and read-in information at the specified address.*

*13. A system for sequentially addressing locations in a random access memory which has an X coordinate addressing channel and a Y coordinate addressing channel comprising:*

*a first address storage means including a plurality of binary storage elements,*

*a second address storage means including a plurality of binary storage elements,*

*a drive means for each of said address storage means for switching each binary element therein from a first stable state to a second stable state,*

*address generating means coupled to each binary element in each of said address storage means responsive to switching of one of said binary storage elements from said second stable state to said first stable state for generating address signals along respective X and Y coordinate addressing channels;*

*and means responsive to each address signal for switch-*

*ing at least one selected binary element in each address storage means to the second stable state,*

*whereby upon energization of said drive means, the random access memory is addressed in accordance with an address stored in binary storage elements in said first and second address storage means, and in response to addressing of said memory the next pre-*

*determined sequential address is stored in said first and second storage means.*

References Cited in the file of this patent or the original patent

UNITED STATES PATENTS

| | | |
|---|---|---|
| 2,800,277 | Williams | July 23, 1951 |
| 2,913,706 | Thorensen | Nov. 17, 1959 |
| 3,036,773 | Brown | May 29, 1962 |